Sept. 21, 1926. 1,600,950
O. C. SCHMIDT
CARCASS DEHAIRING MACHINE
Filed June 29, 1925 3 Sheets-Sheet 3
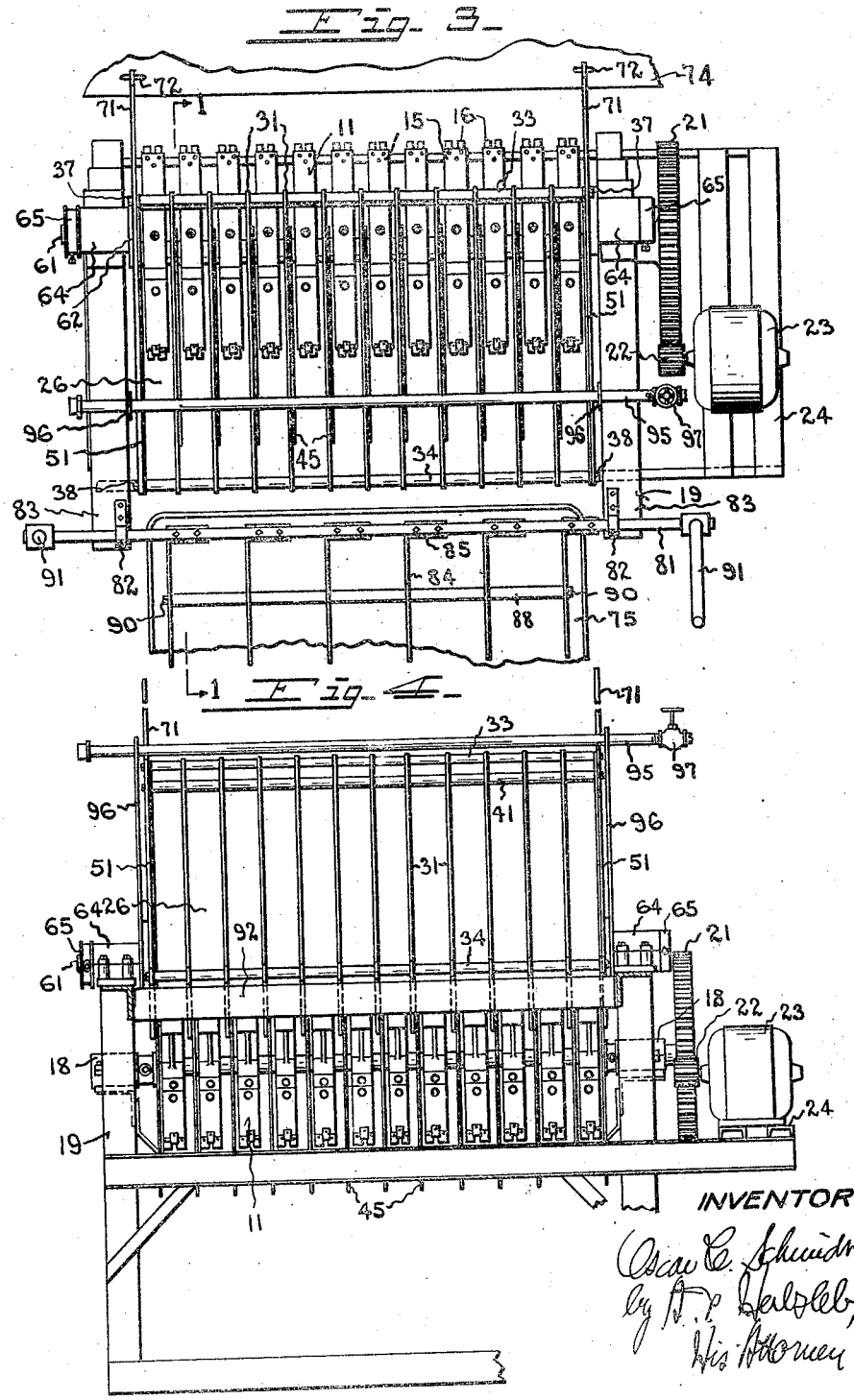

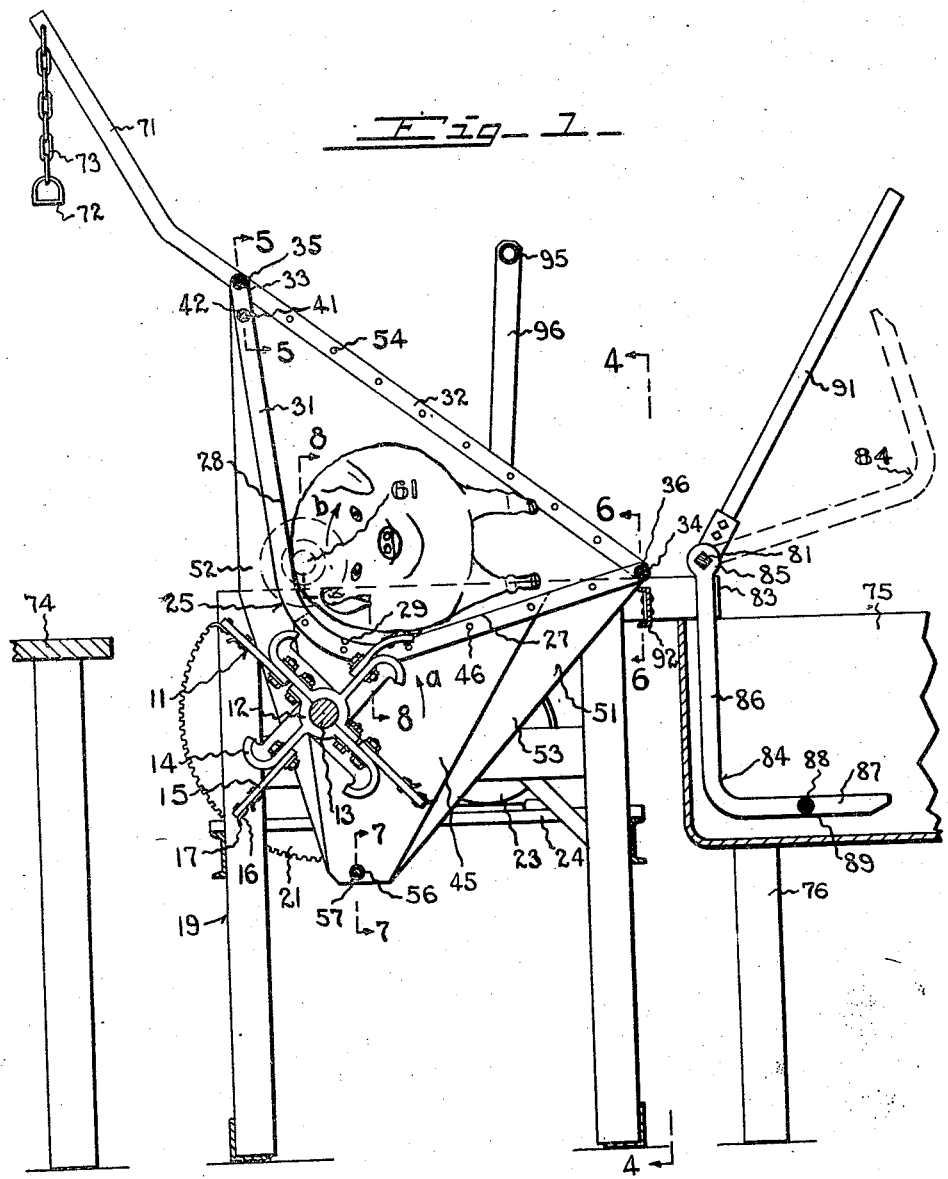

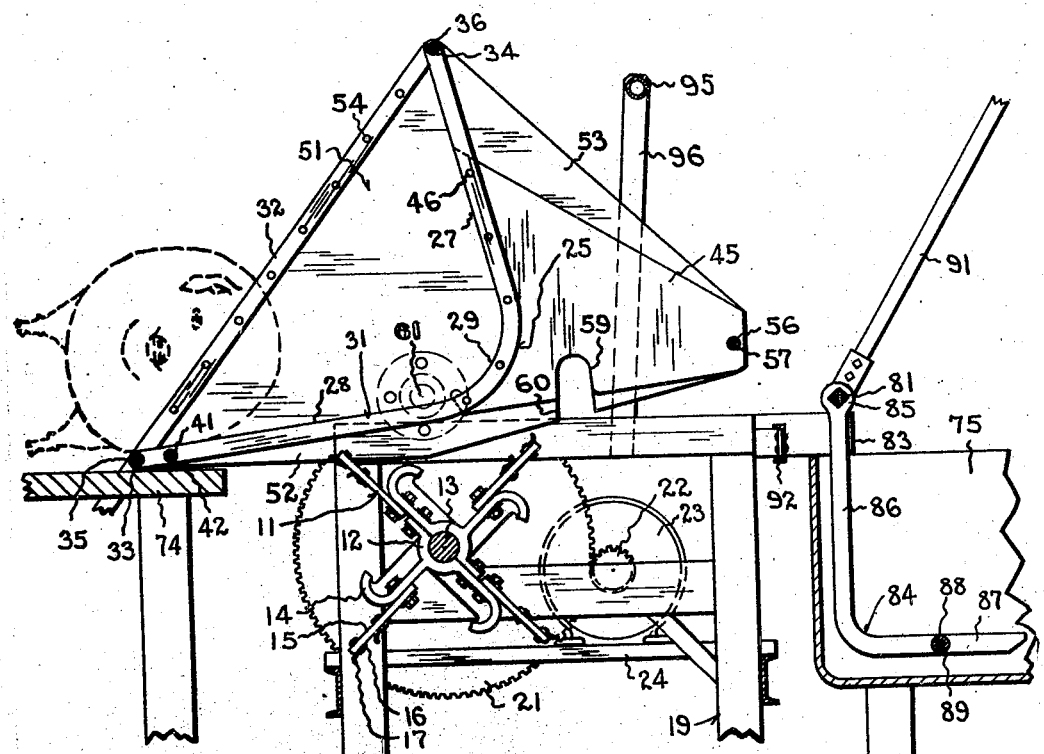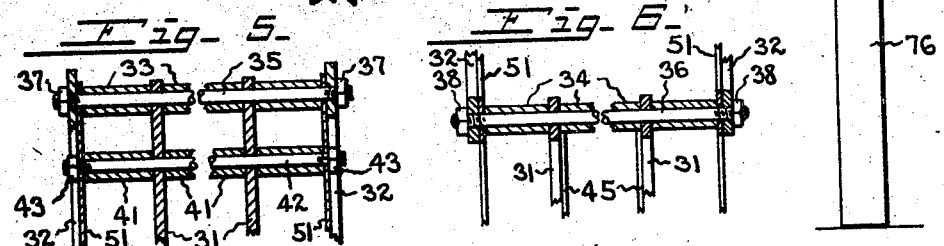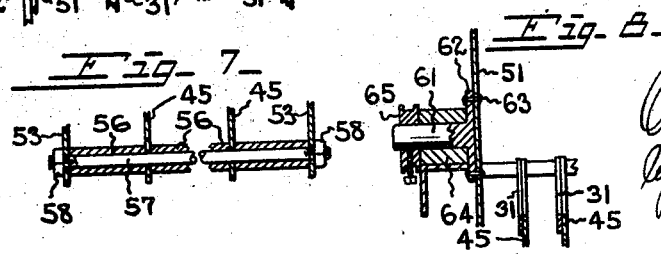

Patented Sept. 21, 1926.

1,600,950

UNITED STATES PATENT OFFICE.

OSCAR C. SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO.

CARCASS-DEHAIRING MACHINE.

Application filed June 29, 1925. Serial No. 40,151.

My invention relates to carcass dehairing machines arranged for dehairing carcasses, such as hogs, and it is the object of my invention to provide a dehairing machine of this character which is economical for use in plants where small numbers of hogs are killed at a time, and to provide a machine which requires little power to operate, and which is so constructed that the carcasses are readily and quickly scalded and dehaired, and delivered from the machine with little expenditure of labor and manipulation.

It is the object of my invention further to so support the hog while being dehaired that little exertion is required to move the hog into discharging position; further, to so relate the scalding vat, the dehairing means, the carcass support for the latter, and the discharge or gambrelling table, that the carcass is readily elevated from the scalding vat and discharged by gravity into the dehairing apparatus, from whence it is discharged in such manner by reason of the novel means for mounting the carcass supporting device, that little power is expended for transferring the carcass from a carcass dehairing position into a carcass discharging position and discharging the carcass.

It is a further object of my invention to provide a novel carcass support, and, further, to provide novel means for mounting the same.

My invention will be further readily understood from the following description and claims, and from the drawings, in which latter:

Fig. 1 is a cross-section of my improved device, taken on the line 1—1 of Fig. 3, showing the carcass in carcass dehairing position, and exemplifying the scalding or tempering tank and the discharge table partly broken away, and showing the feeding-in scoop in assumed position in dotted lines.

Fig. 2 is a similar view, showing the carcass supporting means in carcass discharging position.

Fig. 3 is a plan view of my improved device, partly broken away, with the parts in the relation shown in Fig. 1.

Fig. 4 is a front end elevation of the carcass dehairing machine, partly in section in the plane of the line 4—4 of Fig. 1, and partly broken away.

Figs. 5, 6 and 7 are fragmentary sections respectively taken in the planes of the lines 5—5, 6—6 and 7—7 of Fig. 1; and, Fig. 8 is an axial section of a detail of the pivot means for the carcass support, taken on the irregular line 8—8 of Fig. 1.

Rotary dehairing means are exemplified at 11 as comprising inner rigid members 12, fixed in spaced-apart relation to a shaft 13, and having arms 14, to which flexible resilient scraper-arms 15 are secured in usual manner, the latter having thereon scrapers 16 provided with scraping edges 17 in usual manner. The shaft is exemplified as journaled in bearings 18 in a frame 19. Suitable means are provided for rotating the shaft, as a gear 21 fast thereon, which is meshed by a pinion 22 on the armature shaft of an electric motor 23, fixed on a bracket 24 of the frame of the machine.

A carcass support 25 has openings 26 therein, through which the scraper-arms are arranged to move to contact the carcass, when the carcass support is in carcass dehairing position, exemplified in Fig. 1, for dehairing the carcass.

The carcass support comprises a wall 27 and a wall 28, which are at an angle with relation to each other, preferably a substantial right angle, and have a curved portion 29 therebetween. Means are provided for so supporting the carcass support, that the wall 27 slopes downwardly toward the rotary dehairing means when the carcass support is in carcass dehairing position, and means are provided for tilting the carcass support for removal of the carcass, preferably so that the wall 28 thereof slopes downwardly.

The curved portion of the carcass support and the portions of the walls adjacent thereto, form the carcass supporting portion of the carcass support while in carcass dehairing position, in which position the carcass supporting portion is preferably located above the shaft of the rotary dehairing means, with the wall 28 extending upwardly and preferably slightly rearwardly above the shaft position.

The rotary dehairing means rotate in the direction of the arrow $a$, and act with a raising effect upon the carcass, so as to relieve friction due to weight between the carcass and the supporting faces of the carcass support, and for rotating the carcass in the direction of the arrow $b$, and moving the same against the wall 28, which latter acts to arrest the carcass in said movement, and also acts as a friction retarder on the carcass, so as to obtain the proper dragging effect between the scrapers and the surface of the carcass, in imitation of hand scraping, resulting in a movement of the scrapers across the adjacent portions of the body of the carcass, also acting to rotate the carcass.

I have exemplified the carcass support as comprising bars 31, which are spaced apart for having the spaces 26 therebetween, and are bent to a form so that one of the ends of the bars form the wall 27 of the carcass support, the other end of the bars form the wall 28, and the intermediate bent portions of the bars from the curved portion of said carcass support. Bracing bars 32 are located between the ends of the respective walls of the carcass support.

The respective outer ends of the bars 31 have spacing thimbles 33, 34, therebetween, rods 35, 36, being received through holes in the respective ends of said bars and of said bracing bars and through said thimbles, nuts 37, 38, on the threaded ends of said respective rods clamping the parts together.

In order to further connect said bars to form a substantial rigid grate structure, and at the same time to provide clear spaces between said bars so that the scraper arms rotate freely therebetween at the carcass supporting portion thereof, I provide an additional attaching means between said bars, comprising spacing thimbles 41 between said bars, a rod 42 being arranged to pass through intermediate holes in the bars 31, spaced from the holes therein which accommodate the rod 35, the said rod 42 passing through said intermediate holes and said thimbles 41, nuts 43 clamping the parts rigidly together.

I preferably also provide partitions 45 which extend from said bars and are respectively secured to said respective bars, as by being riveted thereto, as at 46, the said partitions being continuations of the spaces 26 between said bars, in order to receive and protect the legs of the carcasses being rolled about in the carcass support and having the respective scraper-arms rotate therein.

These partitions are preferably secured to the inner faces of the bars at the respective ends of the carcass support, (see Fig. 6), the partitions of one half of the carcass support being secured to one of the faces of said bars and the partitions of the other half of the carcass support being secured to the other face of said bars, so that the feet and legs of the carcass, which usually extend endwise outwardly at both ends of the carcass, may not be damaged.

End-plates 51 are also preferably provided for the carcass support, these end-plates being preferably wider than the intermediate partition plates, as shown at 52, 53, and fixed to the bracing bars 32, as by rivets 54. The rods 35, 36, and 42 may also be received through holes in said end-plates, the nuts threaded to said rods clamping said end-plates in place.

The end-plates are received across the ends of the triangular spaces between the walls 27 and 28.

The lower ends of said plates are connected rigidly together, as by having spacing thimbles 56 therebetween, a rod 57 extending through holes in the ends of said partition plates 45 and end plate 51, and through said spacing thimbles 56, nuts 58 being threaded over the threaded ends of said rod 57 for clamping the parts rigidly together.

A rigid carcass support is thus provided in which spaces are formed, separated by partitions, between which the legs of the carcasses move during the cleaning operation, in order to protect said legs and other parts of the carcass therein from breaking and injury.

The plates may be provided with slots 59, 60, the walls of which are received about the shaft 13, for extending the plates rearwardly of the shaft and enlarging the protecting effect of said partitions.

The carcass support is pivoted to the main frame preferably in such manner that the pivotal axis of the carcass support is on a substantial level with the center of gravity of the carcass and in adjacency to the carcass position, so that little exertion is required to tilt the carcass support in order to discharge the carcass.

I have shown the carcass support pivoted on trunnions 61, the pivotal axes of which are in a horizontal plane above the horizontal plane in which the axis of rotation of the rotary dehairing means is located, and preferably in a horizontal plane below the top of the carcass position in the carcass support. The pivot of the carcass support is preferably so located that when the dehairing operation has been completed and the carcass support is tilted, the carcass will roll toward and past the axis of the pivot to discharge the same.

The axis of the pivot of the carcass support is located in adjacency to an intermediate portion of the carcass support, the device being so constructed preferably that the operator need not lift the entire weight of the carcass, the effect being more a tilting of the carcass about an axis at the carcass for aiding in ready tilting of the carcass support, as will more clearly appear by a comparison of Figs. 1 and 2.

The trunnions extend outwardly endwise beyond the end-plates, and are shown provided with flanges 62 fixed to the end-plates by means of rivets 63. The trunnions or axles rock in bearings 64 on the main frame, collars 65 being secured to said axles outside said bearings.

The carcass support is provided with suitable tilting means, exemplified as an arm 71, shown as an extension of the bracing bar 32. A handle 72 depends on a chain 73 attached to said arm. There is preferably one of these operating arms at each end of the carcass support.

When the carcass support is in carcass dehairing position, as exemplified in Fig. 1, the wall 27 thereof slopes toward the rotary dehairing means, and when the carcass support is moved into carcass discharging position, as exemplified in Fig. 2, the wall 28 thereof slopes downwardly toward its outer end for discharging the carcass by gravity upon a usual discharge table 74.

Carcasses of this character are in practice suitably scalded immediately after the killing, so as to prepare the hair and bristles for ready removal by the rotary dehairing means, as is well known in the practice of the art, and the dehairing takes place immediately after the proper scalding of the carcass has been accomplished. This scaldign may take place in a tempering tank 75, suitably supported on suitable legs 76.

In order to make my improved device a self-contained structure, I prefer to provide means upon the frame of the carcass dehairing machine which are arranged to be moved into the tempering tank and lift the carcass therefrom into the carcass dehairing machine. For this purpose I provide a rock-shaft 81, which is journaled in suitable bearings 82 on brackets 83 of the frame of the carcass dehairing machine. Arms 84 provided with hubs 85 are received about said shaft, and are rigidly secured thereto, and comprise depending shanks 86 and lateral shanks 87, the latter being spaced apart by spacing thimbles 88, a rod 89 being received through holes in said arms and through said thimbles and having nuts 90 over its threaded ends for clamping said parts together.

There is a suitable tempered water in the tempering tank in which the carcasses are placed, the carcass being floated or shifted over the lifting arms or feeding-in scoop for shifting the carcass from the tempering tank into the carcass support. The movement of the arms may be accomplished by means of a handle 91, one of which may be fixed to each end of the rock-shaft 81.

The pivot of this feeding-in device is preferably adjacent to the forward end of the carcass-support when the latter is in down position. This forward end of the carcass support may rest upon a cross-brace 92 of the main frame. When the feeding-in device is shifted to shift the carcass into the carcass support, the shanks 86 will have been moved to slanting position, slanting toward said carcass support, as indicated in dotted lines in Fig. 1, so that the carcass will slide from said shanks into said carcass support and into the range of the rotary dehairing means.

The rotary dehairing means are continuously rotating during operation and act to raise and, in conjunction with the carcass support, to rotate the carcass, and to move the carcass against the wall 28 of the carcass support which, as hereinbefore stated, acts as a retarder upon said rotation, producing sufficient friction so that the scrapers act with long scraping movements against the carcass. The carcass will also during such rotation have endwise motions imparted thereto in reverse directions due to contacts of the sloping sides of the legs and other parts of the carcass against the bars so that all parts of the carcass will be successfully dehaired.

If desired, a flushing pipe 95 may be provided above the carcass support, through apertures in which flushing water may be sprayed upon the carcass for cleaning the carcass and washing away the hair and bristles and scurf, which pipe may be supported on suitable uprights 96 supported by the main frame, and be provided with a valve 97.

The operation of my improved device is quick and simple, the scalding taking place quickly, and the rotary scraping means are rotated at rapid speed for effecting quick removal of the hair, bristles and scurf on the carcass.

The carcass support is so arranged and pivoted that when in dehairing position its front side will over-balance its rear side so as to automatically and normally remain in such dehairing position, and its pivot is so placed that the rotary action of the rotatable scraping device thereon is to move the carcass toward said pivot, but preferably not to over-balance said carcass support, the over-balancing of the carcass support for the purpose of discharging the carcass being accomplished by hand.

This construction and arrangement further makes employment of a latch or latches or similar holding device to maintain the carcass support normally in carcass dehairing position unnecessary, and acts preferably to automatically return the carcass support to carcass dehairing position when the carcass has been discharged therefrom. It is of course obvious that suitable latching means, having connection with the pull handle for automatic release thereof, if desired, may be supplied.

Having thus fully described my invention, what I claim as new, and desire to secure by Letters Patent, is:

1. In a carcass dehairing machine, the combination of rotary dehairing means, a carcass support having an intermediate carcass supporting portion and constructed and arranged for feeding in and discharging the carcass from the sides of said carcass supporting portion and means for pivoting the said carcass support, the axis of rotation of said rotary dehairing means located below the carcass supporting face of said intermediate carcass supporting portion, and the pivotal axis of said carcass support located above the major portion of said carcass supporting face in adjacency to an intermediate portion of said carcass supporting face, said pivotal axis being spaced upwardly from said axis of rotation, with the lower portion of said carcass supporting face when in carcass supporting position located in the same horizontal plane in which said space is located.

2. In a carcass dehairing machine, the combination of rotary dehairing means whose outer ends describe an annular path of travel, a carcass support having a carcass supporting portion and provided with openings through which said rotary dehairing means reach the carcass, and pivot means for said carcass support having a pivotal axis above the axis of rotation of said rotary dehairing means, the radial distance of said pivotal axis and said annular path from said axis of rotation being substantially equal, whereby said rotary dehairing means move the carcass toward the pivotal axis of said pivot means.

3. In a carcass dehairing machine, the combination of rotary dehairing means whose outer ends describe an annular path of travel, a carcass support having a feeding-in side, a carcass supporting portion in rear of said feeding-in side and provided with openings through which said rotary dehairing means reach the carcass, and pivot means for said carcass support having a pivotal axis above the axis of rotation of said rotary dehairing means, the radial distance of said pivotal axis and said annular path from said axis of rotation being substantially equal, whereby said rotary dehairing means move the carcass toward the pivotal axis of said pivot means, and said carcass support over-balanced toward said feeding-in side thereof.

4. In a carcass dehairing machine, the combination of rotary dehairing means whose outer ends describe an annular path of travel, a carcass support having a feeding-in side, a carcass supporting portion in rear of said feeding-in side and provided with openings through which said rotary dehairing means reach the carcass, and pivot means for said carcass support having a pivotal axis above the axis of rotation of said rotary dehairing means, the radial distance of said pivotal axis and said annular path from said axis of rotation being substantially equal, whereby said rotary dehairing means move the carcass toward the pivotal axis of said pivot means, said carcass support over-balanced toward said feeding-in side thereof, and said carcass support with the carcass therein arranged to be moved on said pivotal axis for moving said carcass supporting portion away from said rotary dehairing means and thereby shifting the weight of said carcass past said pivotal axis.

5. In a carcass dehairing machine, the combination of a carcass support comprising a carcass supporting portion and having a feeding-in side and a discharge side at the respective sides of said carcass supporting portion, end-plates rigid therewith, and trunnion pivots extending outwardly from said end-plates in alinement with said carcass supporting portion.

6. In a carcass dehairing machine, the combination of a carcass support comprising a carcass supporting portion and having a feeding-in side and a discharge side at the respective sides of said carcass supporting portion, openings therein through which rotary dehairing means engage the carcass, aprons depending between said openings, end-plates extending across the end of said carcass supporting portion, and trunnions extending endwise beyond said end-plates and rigidly secured with relation thereto, the pivotal axes of said trunnions if extended being adjacent to said carcass supporting portion.

7. In a rotary dehairing machine, the combination of rotary dehairing means comprising scraping arms, a carcass supporting grate comprising bent bars, the intermediate portions of which form a carcass supporting portion when in dehairing position, depending plates between said rotatable scraper arms extending from the inner faces of said bars at the respective ends of said grate, end-plates extending across the ends of said carcass supporting portions, said bars, depending plates and end-plates rigidly secured together, and trunnions extending endwise outside said end-plates and rigidly secured with relation thereto and having pivotal axes which, if extended, lie adjacent to said carcass supporting portion.

8. In a carcass dehairing machine, the combination of a rotatable dehairing means including scraper arms, and a rockable carcass support provided with openings through which said scraper arms move into contact with the carcass when said rockable carcass support is in dehairing position, said rockable carcass support having a feeding-in side, a discharge side and a carcass supporting portion between said sides for locating the carcass position when said carcass support is in dehairing position, and said rockable carcass support pivotally supported at an intermediate portion thereof when in dehairing position below the top of said carcass position and above the axis of rotation of said rotatable dehairing means.

9. The combination with a tempering tank, of a carcass dehairing machine, comprising a frame including an overhanging portion arranged to overhang said tempering tank, rotary dehairing means in said frame spaced laterally from said tempering tank, a carcass support having openings through which said rotary dehairing means act on the carcass, means for mounting said carcass support in said frame, and a feeding-in scoop, arranged to be received in said tempering tank, said scoop pivoted to said overhanging portion of said frame of said carcass dehairing machine in overhanging relation to said tempering tank for transferring the carcasses being dehaired from said tempering tank to said carcass support, and for constituting said carcass dehairing machine and said feeding-in scoop a self-contained structure.

10. In a carcass dehairing machine, the combination of rotary dehairing means comprising scraper arms, a carcass supporting grate comprising bars forming supporting walls in angular relation to each other and having a carcass supporting portion in said angle when in carcass dehairing position, means rigidly securing together the respective outer ends of said bars in spaced-apart relation, aprons depending from and rigidly secured to said bars forming partitions between which said scraper-arms rotate, and means securing together the lower ends of said partitions in spaced-apart relation, said first-named securing means and said last-named securing means located in triangular arrangement about the path of the outer ends of said rotary scraper arms, and constructed and arranged whereby said rotary scraper arms rotate in the space between said securing means securing together respectively the outer ends of said bars and the lower ends of said partitions.

11. In a carcass dehairing machine, the combination of rotary dehairing means comprising scraper arms, a carcass supporting grate comprising bars forming supporting walls in angular relation to each other and having a carcass supporting portion in said angle when in carcass dehairing position, aprons depending from said bars forming partitions, said bars and aprons having spaces therebetween in which said scraper-arms rotate, and end-abutment plates wider than said partitions at the respective ends of said grate, and means securing said bars, said end-abutment plates and said partitions in rigid relation, said securing means located at the respective outer ends of said bars and of said partitions and said end-abutment plates, and extending crosswise of said spaces, and located in triangular arrangement about the paths of said rotary scraper arms and said rotary scraper arms rotating in the spaces between said bars and between said securing means at the respective ends of said bars and partitions.

12. In a carcass dehairing machine, the combination of a carcass support comprising bars whose respective ends are in angular relation to each other and having a curved carcass-supporting portion therebetween, bars between the outer ends of said first-named bars, means connecting together said bars to form triangular spaces between said respective ends and said second-named bars, end-plates in said triangular spaces, trunnions on said end-plates, and rotary dehairing means arranged to operate on the carcass through the spaces between said bars.

In testimony whereof, I have hereunto signed my name.

OSCAR C. SCHMIDT.